US006937986B2

(12) United States Patent
Denenberg et al.

(10) Patent No.: US 6,937,986 B2
(45) Date of Patent: Aug. 30, 2005

(54) AUTOMATIC DYNAMIC SPEECH RECOGNITION VOCABULARY BASED ON EXTERNAL SOURCES OF INFORMATION

(75) Inventors: Lawrence A. Denenberg, Brookline, MA (US); Christopher M. Schmandt, Winchester, MA (US); Erin M. Panttaja, Somerville, MA (US)

(73) Assignee: Comverse, Inc., Wakefield, MA (US)

( * ) Notice: Subject to any disclaimer, the term of this patent is extended or adjusted under 35 U.S.C. 154(b) by 740 days.

(21) Appl. No.: 09/749,615

(22) Filed: Dec. 28, 2000

(65) Prior Publication Data

US 2002/0087328 A1 Jul. 4, 2002

(51) Int. Cl.[7] .............................................. G10L 15/22
(52) U.S. Cl. ..................... 704/275; 704/270; 704/270.1; 379/88.17; 455/456.1
(58) Field of Search ................................ 704/246, 270, 704/275, 231, 238, 243, 245, 251, 254, 255, 256, 257, 272; 379/88.17; 455/456.1; 709/219

(56) References Cited

U.S. PATENT DOCUMENTS

| | | | |
|---|---|---|---|
| 4,839,853 A | | 6/1989 | Deerwester et al. |
| 5,301,109 A | | 4/1994 | Landauer et al. |
| 5,524,139 A | * | 6/1996 | Jones ...................... 379/88.25 |
| 5,724,571 A | | 3/1998 | Woods |
| 5,897,616 A | * | 4/1999 | Kanevsky et al. .......... 704/246 |
| 5,915,001 A | * | 6/1999 | Uppaluru ................. 379/88.22 |
| 5,945,989 A | | 8/1999 | Freishtat et al. |
| 5,995,918 A | | 11/1999 | Kendall et al. |
| 5,995,943 A | | 11/1999 | Bull et al. |
| 6,026,388 A | | 2/2000 | Liddy et al. |
| 6,058,435 A | * | 5/2000 | Sassin et al. ............... 719/331 |
| 6,076,088 A | | 6/2000 | Paik et al. |
| 6,078,886 A | * | 6/2000 | Dragosh et al. ............ 704/270 |
| 6,088,692 A | | 7/2000 | Driscoll |
| 6,405,170 B1 | * | 6/2002 | Phillips et al. .............. 704/270 |
| 6,418,440 B1 | * | 7/2002 | Kuo et al. .................... 707/10 |
| 6,434,524 B1 | * | 8/2002 | Weber ........................ 704/257 |
| 6,560,590 B1 | * | 5/2003 | Shwe et al. ................... 706/55 |
| 6,584,464 B1 | * | 6/2003 | Warthen ......................... 707/4 |
| 6,601,026 B2 | * | 7/2003 | Appelt et al. .................. 704/9 |
| 6,658,093 B1 | * | 12/2003 | Langseth et al. ........ 379/88.17 |
| 6,665,644 B1 | * | 12/2003 | Kanevsky et al. .......... 704/275 |
| 6,741,967 B1 | * | 5/2004 | Wu et al. ...................... 705/10 |
| 6,748,426 B1 | * | 6/2004 | Shaffer et al. .............. 709/219 |
| 6,757,544 B2 | * | 6/2004 | Rangarajan et al. ...... 455/456.1 |
| 6,765,997 B1 | * | 7/2004 | Zirngibl et al. .......... 379/88.18 |
| 6,798,867 B1 | * | 9/2004 | Zirngibl et al. .......... 379/88.17 |
| 2001/0054085 A1 | * | 12/2001 | Kurganov ................... 709/218 |
| 2002/0006126 A1 | * | 1/2002 | Johnson et al. ............. 370/356 |

* cited by examiner

*Primary Examiner*—Susan McFadden
(74) *Attorney, Agent, or Firm*—Staas & Halsey LLP

(57) ABSTRACT

An interactive voice response system is able to respond to questions from users on general topics by including words related to those topics in the grammar of a speech recognition system. Words that are added for all users are obtained from current news reports obtained from news providers accessible via the Internet, or a similar source. In addition, information is stored in an information database about places or people that may be of interest to users, such as weather reports and forecasts for many cities. The grammar of the speech recognition system is modified for an individual user to enable the system to recognize questions relating to, e.g., the weather in one of the cities, only when the system detects that the user has accessed a file containing a word included in the information database. The file may be a message, calendar or address book.

11 Claims, 6 Drawing Sheets

NEWS DATABASE

<identifier>    <content>    <keyword list>    <when obtained>

GLOBAL GRAMMAR DATABASE $timely_news = <current news keywords>
    $news = ((tell me about [the]) | (what is happening in)) $timely_news
    $weather = what is the (forecast for | weather in) $user_weather_cities
    $trains = when are the trains to $user_train_cities
    $flights = when are the flights to $user_flight_cities

GLOBAL INFORMATION DATABASE $weather_cities = Boston | San Francisco | Paris | Tel Aviv | Somerville | ...
    $airline_cities = Boston | San Francisco | Paris | Tel Aviv | ...
    $train_cities = Boston | San Francisco | Paris | Amsterdam | ...

USER SPECIFIC DATABASE

<type>    <contents>    <keywords> type = email, calendar, address book, voice mail
    contents = <actual text>
    keywords = <type> <value>
    ktype = user_weather_city, user_train_city, user_flight_city

FIG. 5

AUTOMATIC DYNAMIC SPEECH RECOGNITION VOCABULARY BASED ON EXTERNAL SOURCES OF INFORMATION

BACKGROUND OF THE INVENTION

1. Field of the Invention

The present invention is directed to updating speech recognition grammars and, more particularly, to automatically updating speech recognition grammars, so that users can receive responses to general questions, such as questions related to current events and locations.

2. Description of the Related Art

Currently, speaker independent speech recognition systems use a limited vocabulary to increase recognition accuracy. Phrases that can be recognized are part of a "grammar." The grammar specifies every possible combination of words which may be spoken by the user. Some of the many commercially available speech recognition systems include Speechworks from Speechworks International, Inc. of Boston, Mass.; Nuance from Nuance of Menlo Park, Calif. and Philips Speech Processing available from Royal Philips Electronics N.V. in Vienna, Austria. All of these systems and many others utilize grammars that can be modified for specific applications. By limiting the size of the grammar, speech recognition systems are now able to recognize spoken commands from many users without requiring training of the system to the way each user pronounces words. Such speaker independent systems can be contrasted with speech recognition systems used with word processing programs that have large vocabularies, must ideally adapt to each user's pronunciation, and have internal grammatical representations, such as statistical language models.

In some applications, the grammars are modified for individual users to recognize terms that the user has indicated might be spoken, such as names of stocks in the user's portfolio. The grammar may even be modified during interaction with the user to include only those words that can be spoken at the current position within a command interface. For example, a voice activated telephone might have an initial grammar limited to "call", numbers, and names that have been recorded by the user for speed dialing, like "home", "mom", etc. After receiving a command to call a number input by speaking the digits of the number, the phone may request confirmation with words in the grammar limited to "yes", "no" and "hang up". An initial grammar is loaded when the application begins, for example, before a call is received by telephone. This grammar defines the basic functionality of the system. It may include subgrammars, which can be activated or deactivated depending on the state of the application. For example, when the application asks a yes/no question, it may activate a subgrammar containing only the words yes and no. Similarly, when the application requests a phone number from the user, it may activate a grammar consisting of only seven or ten digit number strings.

Other portions of the grammar may be specific to a particular user of the system, and will be loaded once that user has been identified. This might include an address book of phone numbers, or stock symbols in a personal portfolio. An example of an address book grammar might be the phrase "Call John Jones," which can be associated with a phone number for John Jones from a specific user's address book. The grammar would not include this phrase for any user who did not have John Jones in his or her address book.

SUMMARY OF THE INVENTION

An object of the present invention is to provide a speaker independent speech recognition system that appears to a user to be more intelligent than conventional speaker independent speech recognition systems.

Another object of the present invention is to provide a speaker independent speech recognition system having an automatically updated grammar.

A further object of the present invention is to automatically update the grammar of a speaker independent speech recognition system using information external to the speaker independent speech recognition system and applications using the speaker independent speech recognition system.

The above objects are attained by providing a method of providing an interactive voice response system which recognizes a spoken question using a grammar that is automatically updated. The words in the grammar may be obtained from a message that a user has accessed or from news reports obtained from at least one news report provider, or from some other source. In any case, the words may be selected using any known technique. For example, in a news report all proper nouns, keywords identified by an editor, or all nouns in a headline might be selected for adding to the grammar.

One embodiment of the present invention preferably stores at least part of the news reports or links thereto and outputs at least one of the news reports or a portion thereof in response to recognizing that the user has spoken a keyword associated with the news report. If more than one news report has the same keyword, any conventional method may be used to navigate among the news stories, including beginning with the most recent news report while accepting commands for "next", "menu", etc. or providing a list of headlines for selection by the user. The news reports may be stored in any conventional format, including audio files or text files that are converted to audio prior to output.

In addition to news reports, an interactive voice response system according to the present invention may supply information related to words found in message(s) accessed by a user during a session. For example, weather information may be provided for place names identified in an e-mail message, the presumed location of a sender of an e-mail message obtained from the user's address book, a location that the user is believed to be near based on, e.g., automatic number identification, or locations obtained from calendar information or other data stored by the user on a system accessible by the interactive voice response system. Examples of other such location specific information could include traffic reports, or plane or train schedules.

There are many other questions which could be included in the grammar based on specific words found in information, such as messages, accessed by a user during a session with an interactive voice response system. One example is that when the name of a company is included in the text of a message, the grammar may be updated so that the user could ask for the current stock price of the company.

Thus, in contrast to the conventional systems described above, the present invention provides a way to modify or create grammars based on external sources of information, other than the user's identity, or the current dialogue state. These sources may be information from outside the application, such as news reports, or derived from information which the application accesses for the user, such as personal messages.

The objects listed above, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 5 is a data structure diagram for databases in an exemplary embodiment.

DETAILED DESCRIPTION OF THE INVENTION

The present invention may be used to augment many types of conventional speech recognition applications, or to provide a separate service to users who want to be able to ask general questions. An exemplary embodiment will be described in which the present invention operates on an information services system like that illustrated in FIG. 1 and described in U.S. Pat. Nos. 5,029,199; 5,263,080; 5,193,110; 5,659,599; 5,524,139; and 5,402,472, all assigned to Comverse Network Systems, Inc. of Wakefield, Mass. and incorporated herein by reference. However, a system could implement the present invention without access to messages for a user, or without access to news reports, depending upon what information is to be provided to users.

Figure 1:
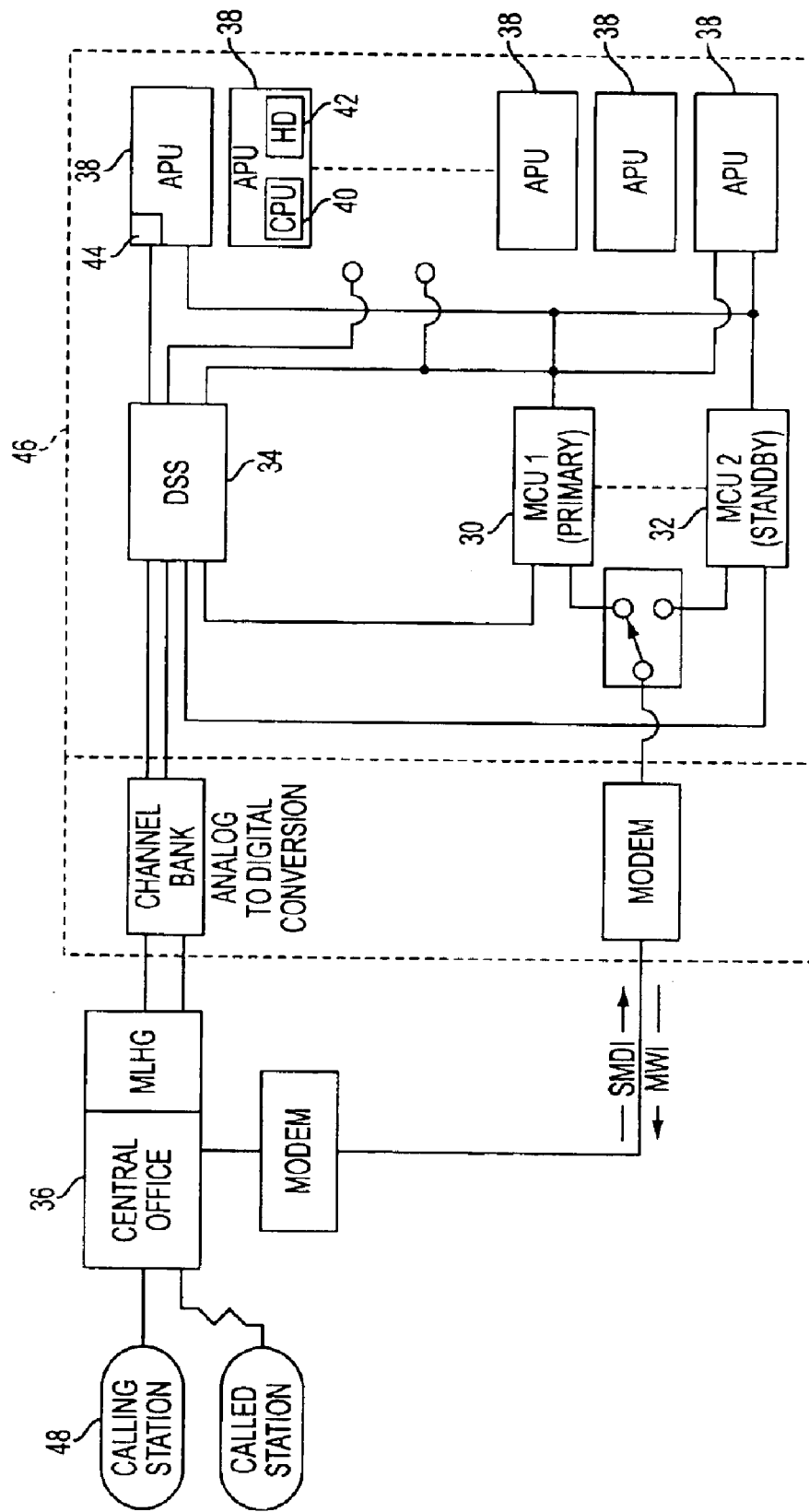
FIG. 1 is a block diagram of an information services system that can be used to implement the present invention.

The system illustrated in FIG. 1 includes both primary 30 and standby 32 master control units (MCUs) that control switching by a digital switching system (DSS) 34. The MCU 30 coordinates the routing of calls from a central office 36, through the DSS 34 to application processing units (APUs) 38. Each APU 38 is a computer with a processor (CPU) 40 and program and data storage (HD) 42, as well as a T1 termination which may include up to 24 voice ports or telephone interface units 44. When a subscriber of the service provided by information services system 46 accesses system 46 from calling station 48, DSS 34 under control of MCU 30 routes the call to an APU 38 programed to perform subscriber call processing. The subscriber is able to access messages stored on hard drive 42 in any of the APUs 38, leave messages for other users and obtain access to other services that are conventionally provided by information services systems.

Figure 2:
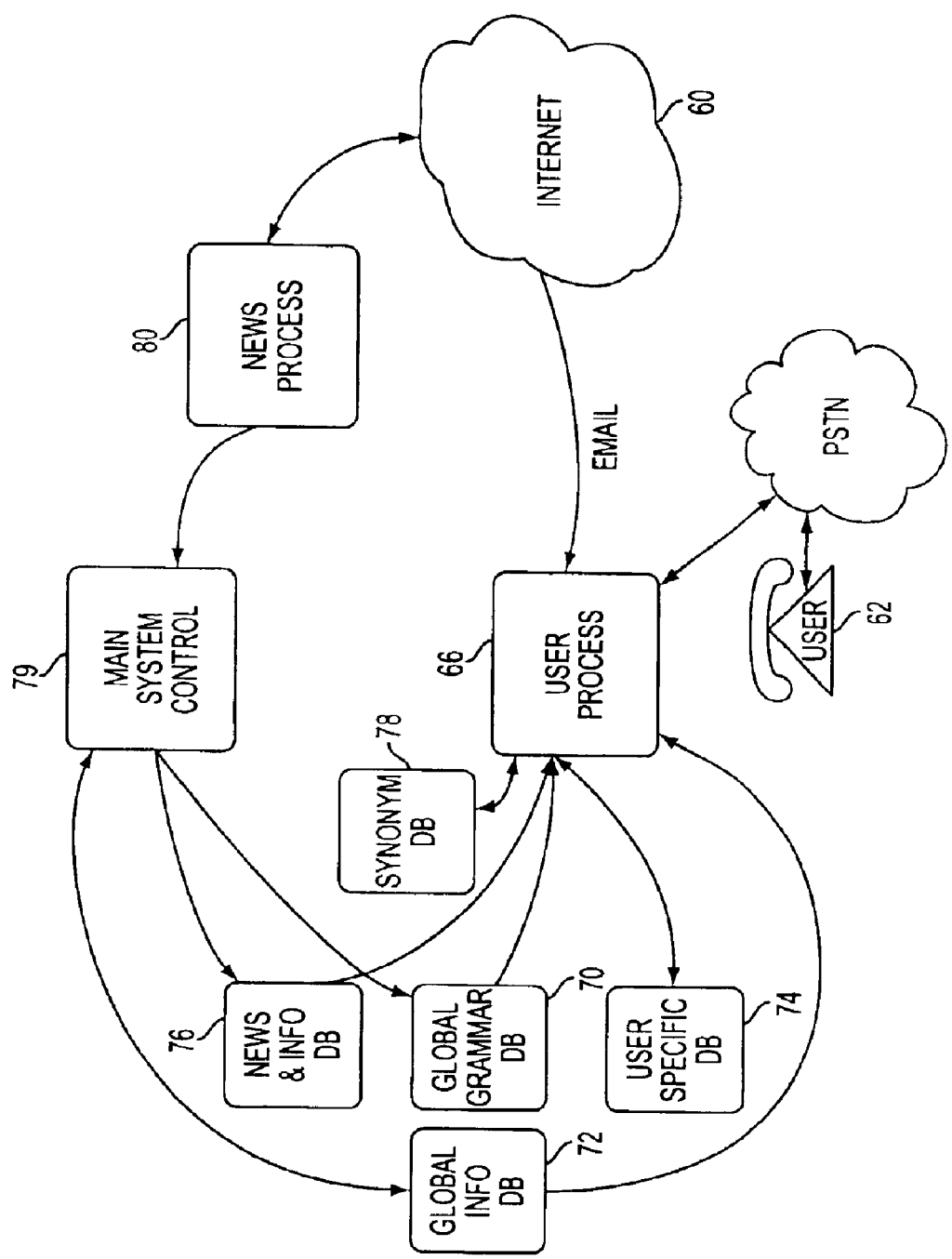
FIG. 2 is a functional block diagram of a system according to the present invention.

A functional block diagram illustrated in FIG. 2 shows major processes of the present invention that may be executed on the MCUs 30, 32 or APUs 38, and interaction with databases accessible by these processes. The databases may be stored in the MCUs 30, 32 or on HD 42 in one or more of the APUs 38, or could be stored on another system accessed via a data communication network, such as the Internet 60. An overview of an exemplary embodiment of the present invention will be provided with reference to FIGS. 1–3.

Figure 3:
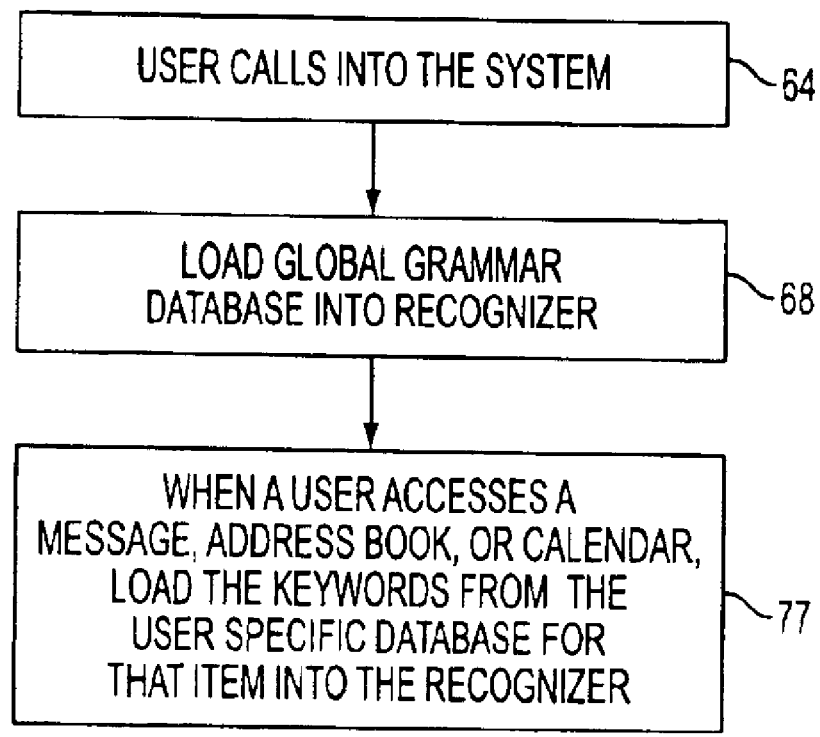
FIGS. 3, 4 and 6 are flowcharts of a method according to the present invention.

As illustrated in FIG. 3, when a user, represented by phone 62 in FIG. 2, calls 64 or otherwise is able to interact with system 46 (FIG. 1), a user process 66 begins execution on, e.g., APU 38. The user process 66 loads 68 global grammar database 70 which defines questions that any user can ask. In addition, information is obtained from user specific database 74 during interaction between the user and user process 66. If the user asks questions about something that the system identifies as a word in the news, user process 66 accesses news and information database 76 to obtain information requested by the user. The information in user specific database 74 is accessed to load 77 keywords that are used to augment the grammar utilized by the speaker independent speech recognition software that has already been loaded with data from the global grammar database 70. These keywords may include synonyms from synonym database 78, e.g., for words in messages received by the user.

The information, such as messages, calendar data and address book data, in user specific database 74 may be maintained by user process 66 using any conventional method. Similarly, the information in global grammar database 70, global information database 72 and news and information database 76 is maintained by main system control process 79 using conventional techniques. The information stored in news and information database 76 is obtained by news process 80 which interacts with main system control process 79 as described below.

In the preferred embodiment, users are able to ask questions about topics in which the interactive voice response system assumes the user may have an interest. There are many possible ways that the topics could be identified. For example, the information stored in news and information database 76 could be obtained from a predefined number of sources specified by the system operator, optionally with additional sources provided by each user for supplemental information unique to each user. Alternatively, the information stored in news and information database 76 could be obtained from news reports or other databases accessible via a data communication network, such as Internet 60, or files stored locally. The news and information database 76 and global information database 72 may be kept at a manageable size if the user or system operator specifies the number of web pages that can be obtained from any information source accessed by news process 80.

Figure 4:
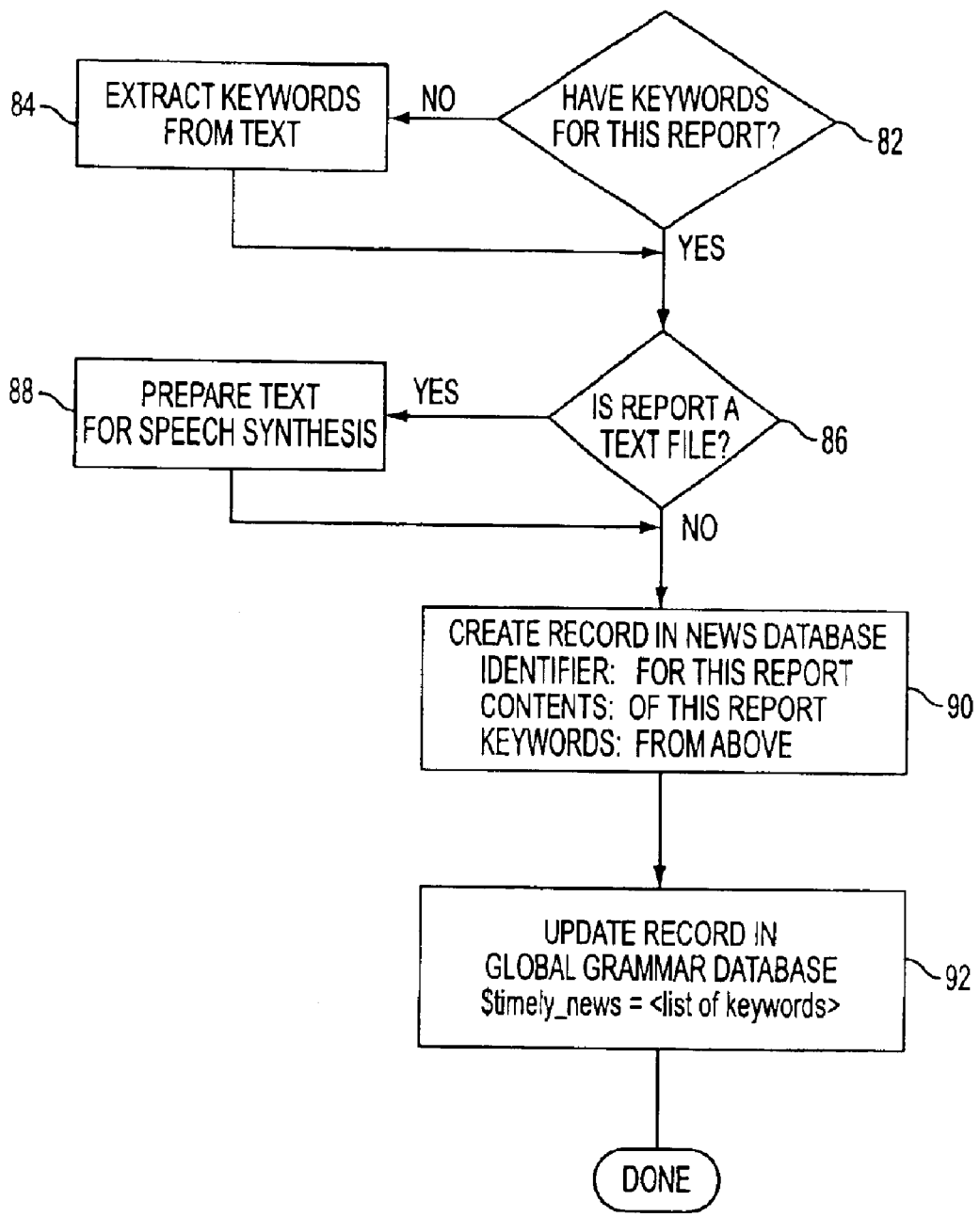

A flowchart illustrating a simplified example of news process 80 is illustrated in FIG. 4. As discussed above, the news stories or other web pages accessed by news process 80 may be identified by keywords or source of information. As each news report is accessed, if keywords were not provided initially or available from the news report provider, the keywords are extracted 84 from information associated with the report or the report itself. Extraction of keywords is done by analysis of headlines, direct delivery of keywords by the content provider, or analysis of the story contents. For example, if the report is contained in an audio file, there may be a synopsis of the report, a title or headline for the report, or other text associated therewith. If keywords were provided 82 when searching for the report, or by the news provider, it is determined 86 whether the report is a text file. If the report is a text file, the text is prepared 88 for speech synthesis in a conventional manner by removing extraneous characters, such as HTML links, etc., and possibly modifying spelling, etc., to result in easier to understand speech. Regardless of whether the report is a text file, a record is created 90 in news and information database 76 with an identifier for the report, contents of the report and the keywords.

A record is also created 92 in global grammar database 70 with a list of the keywords found in all of the stories. As an example, main system control 78 may put the keywords into a variable called $timely_news which is stored in global grammar database 70 along with phrases of the form $news= (tell me about [the])|(what is happening in)) $timely_news. These phrases are created when the application is developed and are specified by the programmer who defines the speech recognition grammar. Such phrases permit users to ask questions like "Tell me about the $timely_news" and "What is the weather in $user_weather_cities" where $timely_ news and $user_weather cities represent symbolic nonterminal symbols in the grammar specification language commonly used by conventional speech recognition software.

The details of how this is done depend on the specifics of the speech recognition software. Some speech recognition software might require a whole new grammar to be loaded, while others might allow a selected region of the grammar, such as the sentences about weather, to be "activated" and "deactivated" under program control.

Examples of the database structure for the news and information database 76 and the global grammar database 70 which are accessed by news process 80, as well as the global information database 72 and user specific database, are provided in FIG. 5. The news and information database 76 includes an identifier (possibly a filename or a URL from Internet 60), the contents of a text report or a link to an audio file or other location where the content of the file can be obtained, and a keyword list. In addition to defining the syntax of questions that can be asked, the global grammar database 70 preferably includes the keywords for all news reports in an array "$timely_news." This permits any user to ask a question related to a news report after global grammar database 70 is loaded into the speech recognition system as described above. As each news report is obtained by news process 80, keywords may be appended to the "$timely_news" array. Similarly, if information is obtained about a new city, relating to weather, airlines, trains, etc., the city name is appended to the corresponding string array in global information database 72.

In one embodiment of the present invention, only current news is provided to users. Therefore, some type of date field is preferably included in the news and information database 76. In the database structure, illustrated in FIG. 5, a "when obtained" field is included. This field may be used by main system control process 79 to perform a daily clean up of all records in the news and information database 76 that are more than one or two weeks old. The news process may check for new stories every hour, every four hours, or some other period. The content or identifier is compared with the news report to determine whether a news report is already stored in the news and information database 76 and the "when obtained" field is updated each time the same news report is found, or the record is overwritten, in case the content has changed slightly.

As discussed above, each time a user interacts with an interactive voice response system according to the present invention, a user specific grammar is generated that includes the contents of global grammar database 70. The global information database 72 contains string arrays, such as weather_cities, identifying information in news and information database 76 that can be used to respond to the questions asked by a user. As the user interacts with the system, the grammar is modified to include words associated with files that the user accesses. For example, if the user accesses a message, all words in the message that are found in global information database 72 are preferably added to the grammar by performing the method illustrated in FIG. 6.

Figure 6:
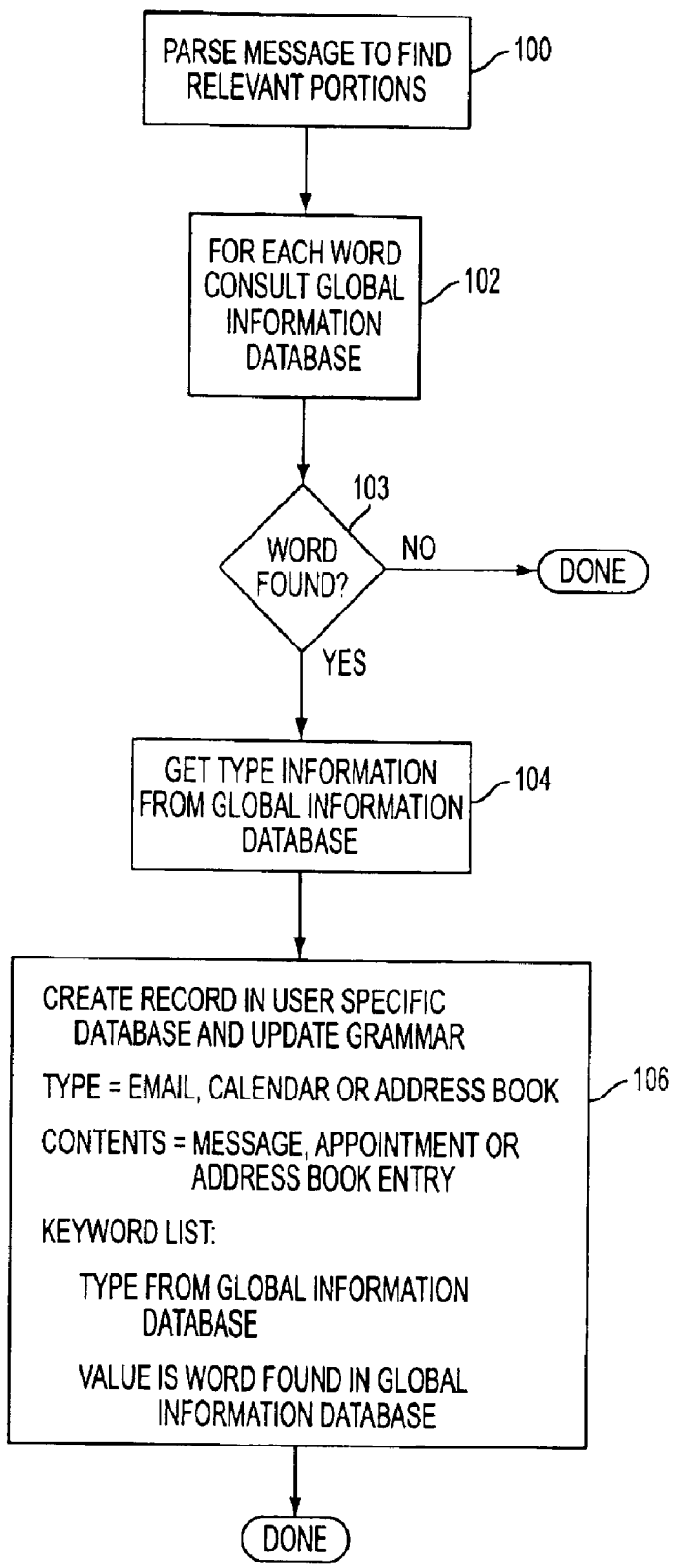

As illustrated in FIG. 6, the contents of messages are parsed 100 to find relevant portion(s). For example, the headers and any non-text portions may be removed. Each word in the relevant portion(s) is compared 102 with the contents of global information database 72 to determine what information can be provided about that word. If the word is found, the record containing the word is obtained 104 from global information database 72, so that a record can be created 106 in user specific database 74. The grammar is updated, so that during a session that the user accesses the message, questions can be asked by the user about information available for these words, such as weather forecasts.

In the case of an e-mail message that is either displayed to the user or processed by text-to-speech software and delivered as audio, the entire message can be parsed 100. For example, an e-mail message may contain information about a conference in Boston. The keyword "Boston" is stored 106 in user specific database 74 in the record for the current message. A similar record would be created if the user accesses a calendar entry containing "Meeting in Boston" or an address book entry for someone in Boston, or a message from someone whose address book entry indicates that they are from Boston. As in the case of a message, the words in the calendar or address book entry are compared 102 with the contents of the global information database 72 and a record is created 106 with the appropriate type and contents. Questions pertaining to Boston which can be answered by information found in global information database 72 are added to the current grammar while the message is being presented.

The process illustrated in FIG. 6 could also be applied to voicemail or facsimile messages. The relevant portions of voicemail and facsimile messages could be the person who left the voicemail message or sent the facsimile. For example, a facsimile header or ANI information may be used to look for the name or number of a caller or facsimile machine in an address book maintained for the user. If an entry is found in global information database 72, the user will able to ask questions about the city where the sender of the message lives, such as "What is the weather in San Diego?"

The many features and advantages of the present invention are apparent from the detailed specification, and thus it is intended by the appended claims to cover all such features and advantages of the system that fall within the true spirit and scope of the invention. Further, numerous modifications and changes will readily occur to those skilled in the art from the disclosure of this invention, thus it is not desired to limit the invention to the exact construction and operation illustrated and described. Accordingly, modifications and equivalents may be resorted to as falling within the scope and spirit of the invention.

What is claimed is:

1. A method of providing an interactive voice response system, comprising:

outputting an audio signal containing a list of available news report providers;

receiving selection of at least one news report provider by a user;

automatically obtaining at least one set of topics for questions spoken by the user from news reports by the at least one news report provider;

automatically updating a grammar using the at least one set of topics; and recognizing at least one word spoken by the user based on the grammar.

2. A method of providing an interactive voice response system, comprising:

automatically obtaining grammar words to be added to a grammar from at least one message for a user by
comparing message words in the at least one message with information in a synonym database to determine synonyms for the message words; and
automatically adding the synonyms to the grammar; and recognizing at least one word spoken by the user using the grammar.

3. A method of providing an interactive voice response system, comprising:

automatically obtaining grammar words to be added to a grammar from at least one e-mail message for a user, based on a source of the e-mail message;

adding information to the grammar from an address book entry for a sender of the e-mail message; and recognizing at least one word spoken by the user using the grammar.

4. A method of providing an interactive voice response system, comprising:

automatically updating a grammar based on calendar information stored for a user; and recognizing at least one word spoken by the user using the grammar.

5. A method as recited in claim 4, wherein said updating includes adding to the grammar to enable said recognizing for questions about locations found in the calendar information.

6. A computer readable medium storing at least one program for controlling an interactive voice response system to perform a method comprising:

automatically comparing message words in at least one message for a user with information in a synonym database to determine synonyms for the message words;

adding the synonyms to a grammar; and recognizing at least one word spoken by the user using the grammar.

7. A computer readable medium storing at least one program for controlling an interactive voice response system to perform a method comprising:

automatically obtaining grammar words to be added to a grammar from at least one e-mail message for a user;

adding information to the grammar from an address book entry for a sender of the at least one e-mail message; and recognizing at least one word spoken by the user using the grammar.

8. A computer readable medium storing at least one program for controlling an interactive voice response system to perform a method comprising:

automatically obtaining grammar words to be added to a grammar from at least one message for a user;

automatically updating the grammar based on calendar information stored for the users; and recognizing at least one word spoken by the user using the grammar.

9. A computer readable medium as recited in claim 8, wherein said updating includes adding to the grammar to enable said recognizing of questions about locations found in the calendar information.

10. An interactive voice response system comprising:

recognition means for recognizing at least one word spoken by a user using a grammar; and update means for automatically updating the grammar based on calendar information from a source external to said interactive voice response system, stored for a user who speaks the at least one word.

11. An interactive voice response system as recited in claim 10, wherein said update means adds to the grammar to enable said recognition means to recognize questions about locations found in the calendar information.

\* \* \* \* \*

UNITED STATES PATENT AND TRADEMARK OFFICE
CERTIFICATE OF CORRECTION

PATENT NO. : 6,937,986 B2
APPLICATION NO. : 09/749615
DATED : August 30, 2005
INVENTOR(S) : Lawrence A. Denenberg et al.

It is certified that error appears in the above-identified patent and that said Letters Patent is hereby corrected as shown below:

Column 8, Line 15, delete "users" and insert -- user; -- therefor.
Column 8, Line 23, after "system" insert -- , --.

Signed and Sealed this

Fifth Day of December, 2006

JON W. DUDAS
*Director of the United States Patent and Trademark Office*